United States Patent
Lee et al.

(10) Patent No.: US 8,057,085 B2
(45) Date of Patent: Nov. 15, 2011

(54) ILLUMINATION APPARATUS USING LIGHT GUIDE AND PORTABLE TERMINAL HAVING THE SAME

(75) Inventors: Joo-Hoon Lee, Yongin-si (KR); Sun-Tae Jung, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 309 days.

(21) Appl. No.: 12/473,870

(22) Filed: May 28, 2009

(65) Prior Publication Data

US 2010/0008103 A1    Jan. 14, 2010

(30) Foreign Application Priority Data

Jul. 9, 2008    (KR) .................. 10-2008-0066523

(51) Int. Cl.
*F21V 8/00*    (2006.01)
(52) U.S. Cl. ..................... 362/612; 362/555; 362/628

(58) Field of Classification Search ................ 362/555
See application file for complete search history.

(56) References Cited

U.S. PATENT DOCUMENTS

| | | | |
|---|---|---|---|
| 7,147,356 B2* | 12/2006 | Tamaki ...................... 362/551 |
| 7,458,695 B2* | 12/2008 | Birman et al. ................ 362/26 |
| 2004/0066659 A1* | 4/2004 | Mezei et al. ................. 362/555 |
| 2006/0002146 A1* | 1/2006 | Baba ........................... 362/613 |
| 2006/0260922 A1 | 11/2006 | Lee et al. |
| 2009/0040785 A1* | 2/2009 | Shimura et al. ............. 362/609 |

* cited by examiner

*Primary Examiner* — Laura Tso
(74) *Attorney, Agent, or Firm* — The Farrell Law Firm, P.C.

(57) ABSTRACT

An illumination apparatus includes at least one light source for outputting light, a light guide for guiding light input from the at least one light source through multiple reflections in the light guide, at least one groove formed on the light guide to reflect incident light, and a light extraction pattern formed on a surface of the light guide to output the incident light to an exterior of the light guide.

11 Claims, 12 Drawing Sheets

ILLUMINATION APPARATUS USING LIGHT GUIDE AND PORTABLE TERMINAL HAVING THE SAME

PRIORITY

This application claims priority under 35 U.S.C. §119(a) to a Korean Patent Application filed in the Korean Intellectual Property Office on Jul. 9, 2008 and assigned Serial No. 10-2008-0066523, the contents of which are incorporated herein by reference.

BACKGROUND OF THE INVENTION

1. Field of the Invention

The present invention relates generally to an illumination apparatus, and more particularly, to an illumination apparatus using a light guide and a portable terminal having the same.

2. Description of the Related Art

An illumination apparatus with a light guide is generally used as the backlight for a Liquid Crystal Displays (LCDs), or to illuminate portable terminal keypads. Such an illumination apparatus conventionally includes a light guide having the shape of a rectangular flat board and guiding light through multiple reflections between its upper and lower surfaces. The light guide includes light extraction patterns provided to output the light within the light guide to the exterior at the upper and lower surfaces.

U.S. published application No. 20060260922, published on 23 Nov. 2006 and entitled "Keypad and Keypad Assembly", discloses a light guide panel for keypad illumination. The light guide panel illuminates a plurality of key buttons on the keypad by reflecting the light towards the panel exterior. The light is generated by luminous elements and is input into the guide. The panel includes a plurality of reflection patterns that are locally formed on the key buttons on a one-to-one basis, to reflect a part of the light propagating in the light guide panel toward the associated key buttons for each pattern.

Since most consumers consider the design of manufactured goods in purchasing portable terminals, attempts are being made to improve external illumination of the products.

The illumination apparatus with a light guide is attractive due to its efficient use of resources and high illumination uniformity. However, when used for external illumination of portable terminals, the conventional illumination apparatus with a light guide has low resource efficiency and difficult implementation, as well as inefficient light-output.

Accordingly, there is a need in the art for an illumination apparatus with a light guide, which can be efficiently applied for external illumination of portable terminals.

SUMMARY OF THE INVENTION

An aspect of the present invention is to address at least the above-mentioned problems and/or disadvantages and to provide at least the advantages described below. Accordingly, an aspect of the present invention is to provide an illumination apparatus with an efficient light guide for external illumination of a portable terminal.

In accordance with the present invention, there is provided an illumination apparatus including at least one light source for outputting light, a light guide for guiding a light input from the at least one light source through multiple reflections in the light guide, at least one groove formed on the light guide to reflect an incident light, and a light extraction pattern formed on a surface of the light guide to output the incident light to an exterior of the light guide.

In accordance with the present invention, there is provided an illumination apparatus including at least one light source for outputting light, a light guide having a shape of a partially opened or closed loop and guiding a light input from the at least one light source through multiple reflections in the light guide, and a light extraction pattern formed on a surface of the light guide to output an incident light to an exterior of the light guide.

BRIEF DESCRIPTION OF THE DRAWINGS

The above and other aspects, features and advantages of preferred embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE PREFERRED EMBODIMENTS

The following description with reference to the accompanying drawings is provided to assist in a comprehensive understanding of preferred embodiments of the invention as defined by the claims and their equivalents. Those of ordinary skill in the art will recognize that various modifications of the embodiments described herein can be made without departing from the scope and spirit of the invention. Descriptions of well-known functions and constructions are omitted for the sake of clarity and conciseness.

The terms used in the following description and claims are not limited to the conventional meanings, and are used to enable a clear understanding of the invention. Accordingly, it should be apparent to those skilled in the art that the following description is provided for illustrative purposes only and not for limiting the invention as defined by the appended claims and their equivalents.

Figure 1:
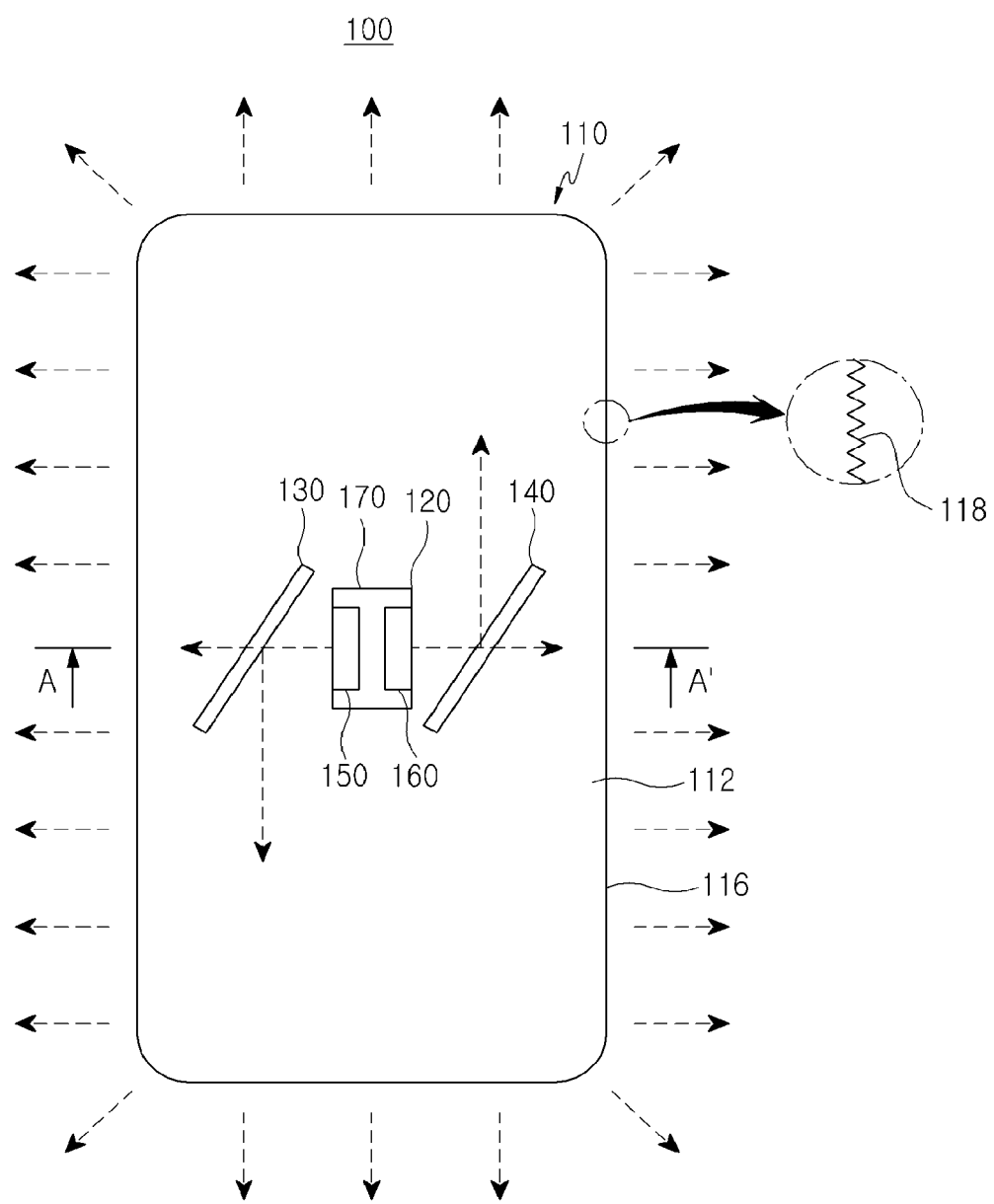
FIG. 1 illustrates an illumination apparatus according to a first embodiment of the present invention.
Figure 2:
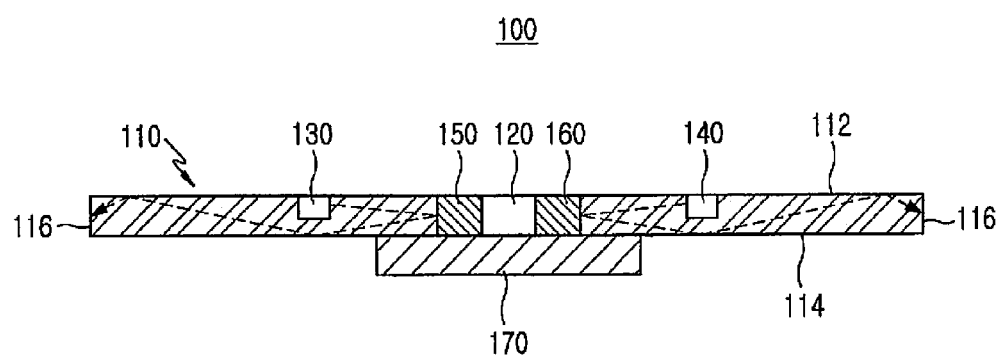
FIG. 2 illustrates the illumination apparatus from the perspective of line A-A' of FIG. 1.

FIG. 1 illustrates an illumination apparatus 100 according to a first embodiment of the present invention, and FIG. 2 illustrates the illumination apparatus 100 from the perspective of line A-A' of FIG. 1.

The illumination apparatus 100 includes a light guide 110, first and second light sources 150 and 160, and a circuit board 170.

The light guide 110, which has a shape of a substantially rectangular flat board, includes opposed upper and lower surfaces 112 and 114, and outer sides 116 between the upper and lower surfaces 112 and 114. The majority of the light input into the light guide 110 propagates through multiple reflections between the upper and lower surfaces 112 and 114, and the multiple reflections may include common total internal reflection. Light extraction patterns 118 are formed on the outer sides 116 of the light guide 110, and the light incident on the light extraction patterns 118 is output to the exterior of the light guide 110 through scattering, refraction or penetration, for example.

For example, the light extraction patterns 118 are shaped by processing the outer sides 116 of the light guide 110 using a Numerical Control (NC) machine tool, so that the outer side surfaces become rough. The light extraction patterns 118 are shaped by machining, laser processing, scratching, printing, etching, coating, or combination thereof, and are implemented by regularly arranging the units in random, hemispherical or prism shapes. These units are shaped by such techniques as etching or injection molding. Alternatively, these units are formed on separate films that are attached to the outer sides 116 of the light guide 110. In addition, the light extraction patterns 118 are shaped while the light guide 110 is shaped by injection molding.

The amount of light output from the outer sides 116 of the light guide 110 is controlled by adjusting the roughness of the surface of the outer sides 116. The upper surface 112 and the lower surface 114 of the light guide 110 are subjected to mirror-surface processing, through which the upper surface 112 and the lower surface 114 may have smooth surfaces so that scattering can be suppressed. The uniformity of the light output from the outer sides 116 of light guide 110 is controlled by adjusting the location, height, angle and shape of first and second grooves 130 and 140.

The light guide 110 includes a hole 120 located at its center to accommodate the first and second light sources 150 and 160, and the first and second grooves 130 and 140 situated at opposing sides of the hole 120. The hole 120 is rectangular in shape and defined by 4 inner sides. The first light source 150 is disposed such that its light-emitting surface faces at least a first of the inner sides. The second light source 160 is disposed such that its light-emitting surface faces a second inner side opposing the first inner side.

The first groove 130, which is rectangular and formed in a depth of about 0.5 to 0.8 times the thickness of the light guide 110, from the upper surface 112 of the light guide 110, is formed such that its longitudinal axis is tilted with respect to an optical axis of the first light source 150 by an angle such as 45°. The optical axis of the first light source 150 is normal to the light-emitting surface of the first light source 150.

Similarly, the second groove 140, which is rectangular and formed in a depth of about 0.5 to 0.8 times the thickness of the light guide 110, from the upper surface 112 of the light guide 110, is formed such that its longitudinal axis is tilted with respect to an optical axis of the second light source 160 by a an angle such as 45°. The inner sides of the hole 120, and the inner sides and bottom sides of the first and second grooves 130 and 140 are subjected to mirror-surface processing.

The light guide 110 is formed by mirror-surface cutting processing using an NC machine tool, or by injection-molding using a mirror-surface processed mold. The roughness-of-surface of the outer sides 116 is controlled by adjusting the number of rotations and the shape of the bit mounted in the NC machine tool.

The light output from the first light source 150 is incident on the first groove 130 after passing through the corresponding inner side of the hole 120, and the first groove 130 passes a part of the incident light and reflects the rest of the incident light. Similarly, the light output from the second light source 160 is incident on the second groove 140 after passing through the corresponding inner side of the hole 120, and the second groove 140 passes a part of the incident light and reflects the rest of the incident light.

The light passing through the first and second grooves 130 and 140 propagates in opposite directions, and the light reflected from the first and second grooves 130 and 140 also propagates in opposite directions. Light is output from the 4 respective outer sides 116 of the light guide 110 by means of the first and second grooves 130 and 140. Red-Green-Blue (RGB) side emitting Light Emitting Diodes (LEDs), for example, are used as the first and second light sources 150 and 160.

The circuit board 170 includes a drive circuit mounted on its upper surface to drive the first and second light sources 150 and 160, and the upper surface of the circuit board 170, on which the first and second light sources 150 and 160 are mounted, is attached to the lower surface 114 of the light guide 110. A common flexible printed circuit board can be used as the circuit board 170.

Figure 3:
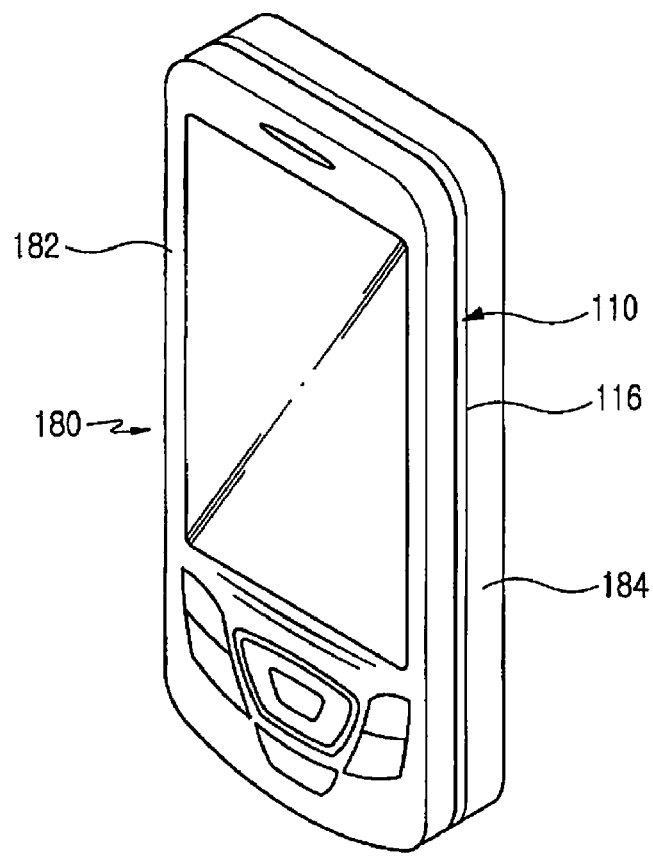
FIG. 3 illustrates a portable terminal with the illumination apparatus illustrated in FIG. 1.

FIG. 3 illustrates a portable terminal 180 with the illumination apparatus 100 illustrated in FIG. 1. On the front face of the portable terminal 180 is disposed an LCD, a keypad and a speaker, and the illumination apparatus 100 is installed in the portable terminal 180. The outer side 116 of the light guide 110 is exposed on or faces the side 184 of the portable terminal 180.

Figure 4:
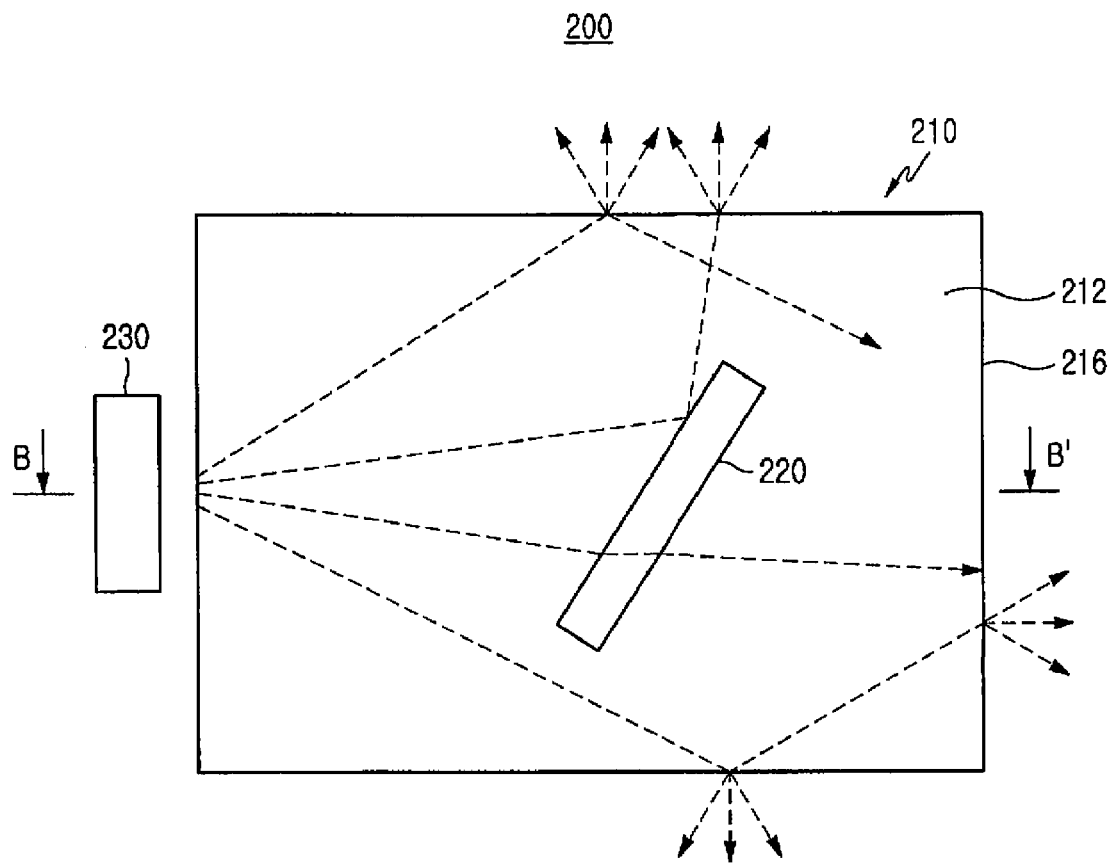
FIG. 4 illustrates an illumination apparatus according to a second embodiment of the present invention.
Figure 5:
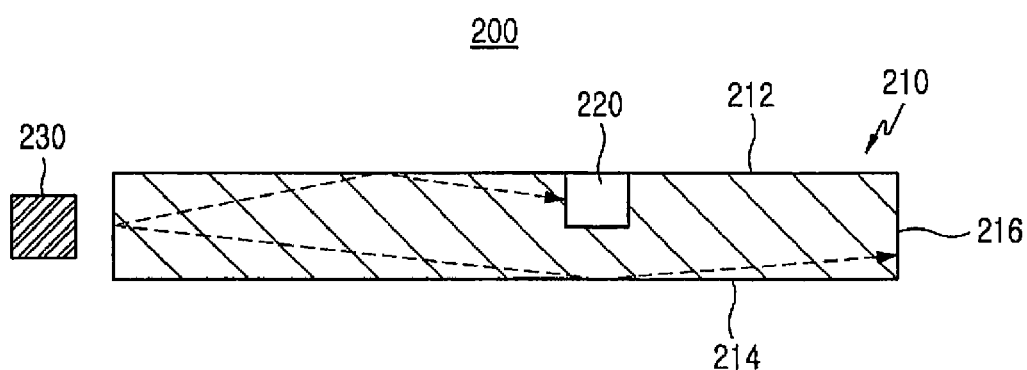
FIG. 5 illustrates the illumination apparatus from the perspective of line B-B' of FIG. 4.

FIG. 4 illustrates an illumination apparatus 200 according to a second embodiment of the present invention, and FIG. 5 illustrates the illumination apparatus 200 from the perspective of line B-B' of FIG. 4.

The illumination apparatus 200 includes a light guide 210 and a light source 230.

The light guide 210, which has a substantially rectangular shape, includes opposed upper and lower surfaces 212 and 214, and outer sides 216 between the upper and lower surfaces 212 and 214. The majority of the light input into the light guide 210 propagates through multiple reflections between the upper and lower surfaces 212 and 214. Light extraction patterns are formed on the outer sides 216 of the light guide 210, and the light incident on the light extraction patterns is output to the exterior of the light guide 210 through scattering, refraction or penetration, for example.

The light guide 210 includes a groove 220 situated in its center. The groove 220 is rectangular and has a depth of about 0.5 to 0.8 times the thickness of the light guide 210, from the upper surface 212 of the light guide 210. The groove 220 is formed such that its longitudinal axis is tilted with respect to an optical axis of the light source 230 by an angle such as 45°.

The light source 230 is disposed such that its light-emitting surface faces one of the 4 outer sides 216 of the light guide 210.

The light output from the light source 230 is input into the light guide 210, and a part of the input light is incident on the groove 220. The groove 220 passes a part of the incident light, and reflects the rest of the incident light.

Figure 6:
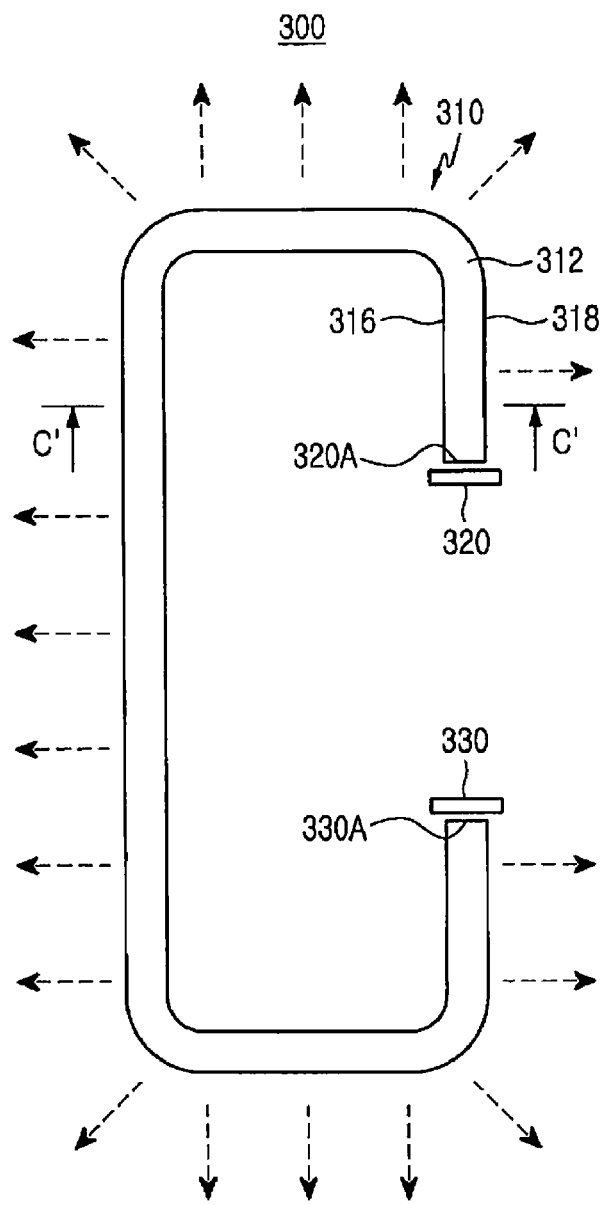
FIG. 6 illustrates an illumination apparatus according to a third embodiment of the present invention.
Figure 7:
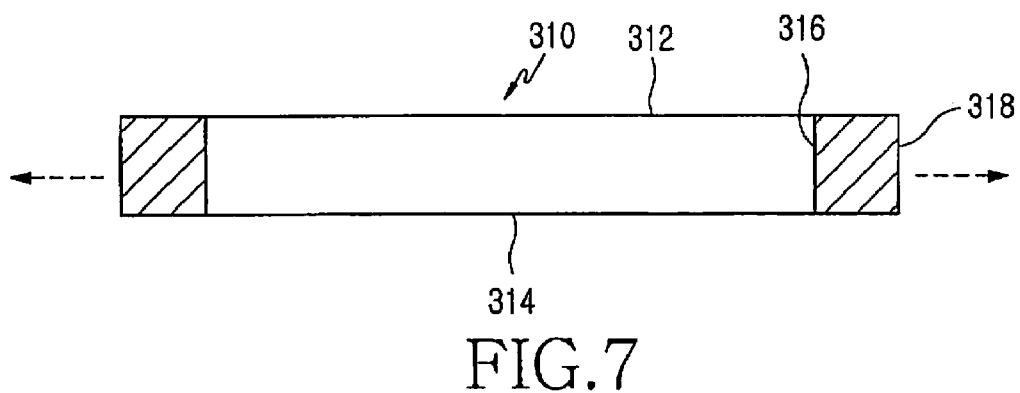
FIG. 7 illustrates the illumination apparatus from the perspective of line C-C' of FIG. 6.

FIG. 6 illustrates an illumination apparatus 300 according to a third embodiment of the present invention, and FIG. 7 illustrates the illumination apparatus 300 from the perspective of line C-C' of FIG. 6.

The illumination apparatus 300 includes a light guide 310, and first and second light sources 320 and 330.

The light guide 310 has a substantial C-shape or partially opened loop shape, and includes opposed upper and lower surfaces 312 and 314, and inner and outer sides 316 and 318 between the upper surface 312 and the lower surface 314. For example, the light guide 310 can be implemented by bending a long rectangular strip with a width of 5 mm and a thickness of 2.5 to 4 mm in a C-shape. The majority of the light input into the light guide 310 propagates through multiple reflections between the upper surface 312 and the lower surface 314, or between the inner and outer sides 316 and 318, and the multiple reflections may include common total internal reflection.

Light extraction patterns are formed on the outer side 318 of the light guide 310, and the lights incident on the light extraction patterns is output to the exterior of the light guide 310 through scattering, refraction or penetration, for example. The amount of light output from the outer side 318 of the light guide 310 can be controlled by adjusting roughness-of-surface of the outer side 318. The upper and lower surfaces 312 and 314 and the inner side 316 of the light guide 310 are subjected to mirror-surface processing, through which the upper and lower surfaces 312 and 314 and the inner side 316 are smooth so that scattering can be suppressed.

As the light propagates from the light sources 320 and 330, the amount of propagating light gradually decreases due to the light output to the exterior. To offset the non-uniformity of light output over the propagation distance, the light guide 310 is formed such that roughness-of-surface of the outer side 318 gradually increases as its distance increases from the light sources 320 and 330. The light guide 310 is shaped by mirror-surface cutting processing using an NC machine tool, or by injection-molding using a mirror-surface processed mold. The roughness-of-surface of the outer side 318 is controlled by adjusting the number of rotations or the shape of the bit mounted in the NC machine tool.

The first light source 320 is disposed such that its light emitting surface faces a first end 320A of the light guide 310, and the second light source 330 is disposed such that its light emitting surface faces a second end 330A of the light guide 310. The light output from the first light source 320 is input into the light guide 310 through the first end 320A, and the input light propagates from the first end 320A to the second end 330A of the light guide 310. The light output from the second light source 330 is input into the light guide 310 through the second end 330A, and the input light propagates from the second end 330A to the first end 320A of the light guide 310.

Figure 8:
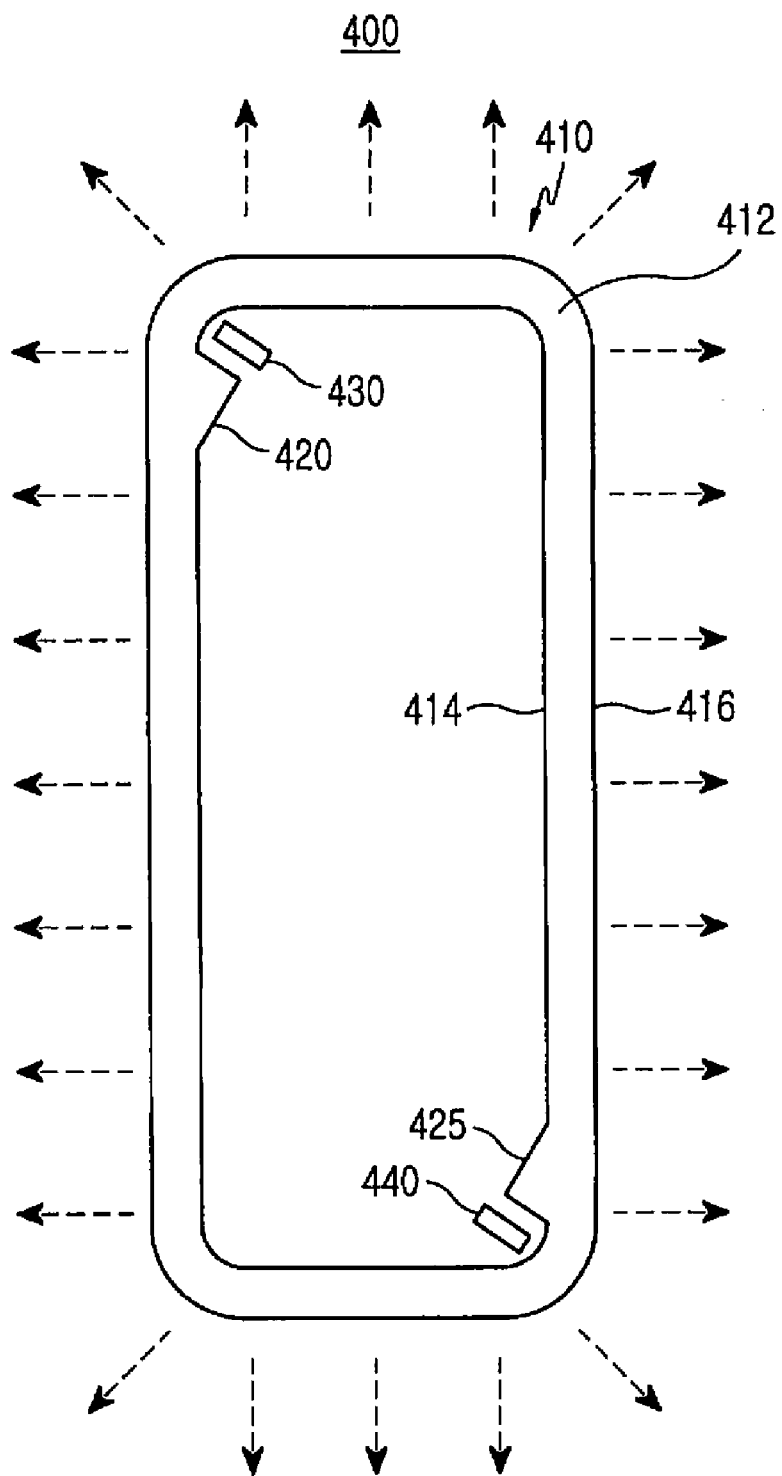
FIG. 8 illustrates an illumination apparatus according to a fourth embodiment of the present invention.

FIG. 8 illustrates an illumination apparatus 400 according to a fourth embodiment of the present invention.

The illumination apparatus 400 includes a light guide 410, and first and second light sources 430 and 440.

The light guide 410, which has a substantially rectangular shape, includes opposed upper surface 412 and lower surface (not shown), and inner and outer sides 414 and 416 between the upper surface 412 and the lower surface. The light guide 410, which has a rectangular cross section, includes first and second coupling portions 420 and 425 for light coupling. Each of the coupling portions 420 and 425 protrudes from the inner side 414 to the inside of the light guide 410 in a triangular shape.

The light sources 430 and 440 are disposed such that their light emitting surfaces face pertinent sides of the coupling portions 420 and 425, respectively. The majority of the light input into the light guide 410 propagates through multiple reflections between the upper surface 412 and the lower surface, or between the inner and outer sides 414 and 416. The multiple reflections include common total internal reflection. Light extraction patterns are formed on the outer side 416 of the light guide 410, and the light incident on the light extraction patterns is output to the exterior of the light guide 410 through scattering, refraction or penetration, for example.

The light output from the first light source 430 is input into the light guide 410 through one side of the first coupling portion 420, and the input light circulates through the light guide 410. Similarly, the light output from the second light source 440 is input into the light guide 410 through one side of the second coupling portion 425, and the input light circulates through the light guide 410.

Figure 9:
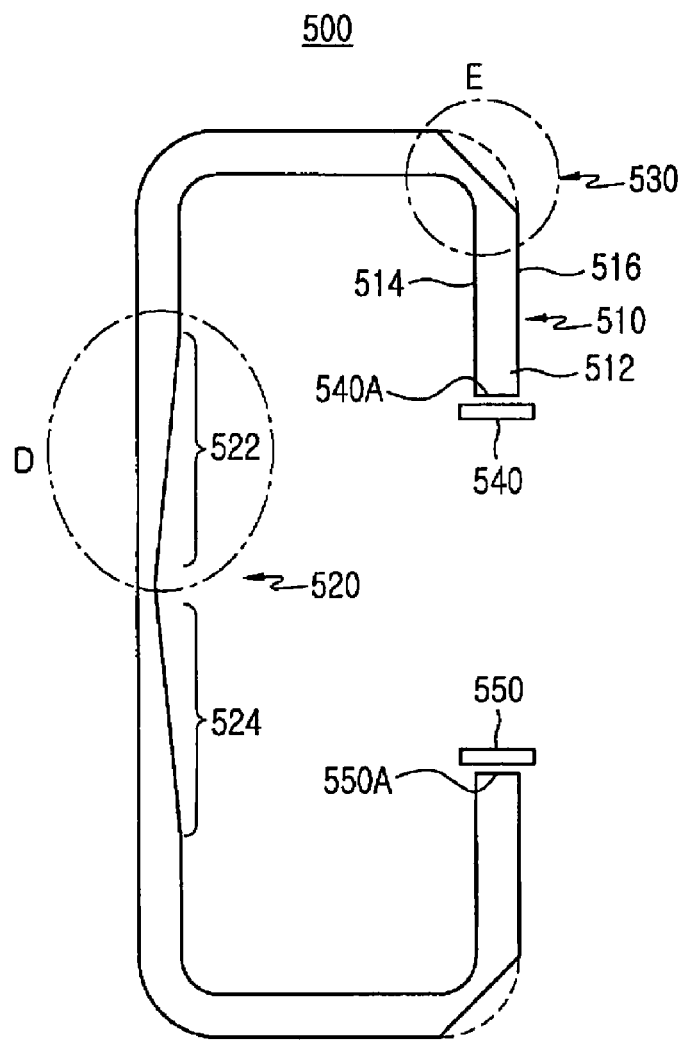
FIG. 9 illustrates an illumination apparatus according to a fifth embodiment of the present invention.
Figure 10:
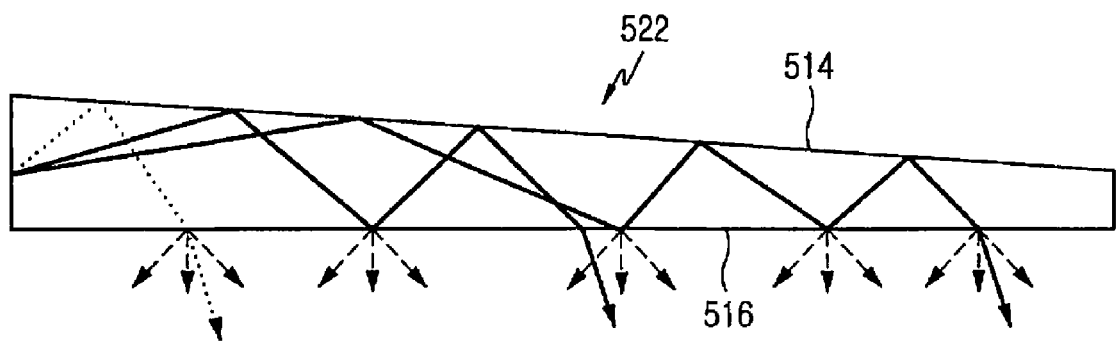
FIG. 10 illustrates a portion of the illumination apparatus in circle D of FIG. 9.

FIG. 9 illustrates an illumination apparatus 500 according to a fifth embodiment of the present invention, and FIG. 10 illustrates a portion of the illumination apparatus in circle D of FIG. 9.

The illumination apparatus 500 includes a light guide 510, and first and second light sources 540 and 550.

The light guide 510 is substantially C-shaped and includes opposed upper surface 512 and lower surface (not shown), and inner and outer sides 514 and 516 between the upper surface 512 and the lower surface. The light guide 510 is implemented by bending a long rectangular strip in a C-shape. The majority of the light input into the light guide 510 propagates through multiple reflections between the upper surface 512 and the lower surface, or between the inner and outer sides 514 and 516. The multiple reflections include common total internal reflection. Light extraction patterns are formed on the outer side 516 of the light guide 510, and the light incident on the light extraction patterns is output to the exterior of the light guide 510 through scattering, refraction or penetration, for example.

First and second tapered portions 522 and 524 are formed in a middle part 520 of the light guide 510 to increase light output, and each of the tapered portions 522 and 524 gradually increases or decreases in width along its longitudinal direction. The first tapered portion 522 and the second tapered portion 524 gradually decrease in width towards the middle of the light guide 510, from opposing directions. The tapered portions 522 and 524 become thinner in such a manner that the inner side 514 approaches the outer side 516.

An edge 530 of the light guide 510, shown in a circle E, is subjected to slanting or chamfering to increase the light output.

The first light source 540 is disposed such that its light emitting surface faces a first end 540A of the light guide 510, and the second light source 550 is disposed such that its light emitting surface faces a second end 550A of the light guide 510. The light output from the first light source 540 is input into the light guide 510 through the first end 540A, and the input light propagates from the first end 540A to the second end 550A of the light guide 510. The light output from the second light source 550 is input into the light guide 510 through the second end 550A, and the input light propagates from the second end 550A to the first end 540A of the light guide 510.

The light propagating through the tapered portions 522 and 524 incurs a change in the angle of reflection as the widths of the tapered portions 522 and 524 gradually decrease. Thus, if a loss of the light over the propagation distance is negligible, an increasing amount of light is output to the exterior of the tapered portions 522 and 524 as the width of the light guide 510 gradually decreases. That is, as the light propagates from the light sources 540 and 550, the amount of propagating light gradually decreases due to the light output to the exterior. Accordingly, the tapered portions 522 and 524 are used to offset the non-uniformity of light output over the propagation distance. Therefore, use of the tapered portions 522 and 524 improves the overall illumination uniformity of the light guide 510.

Figure 11:
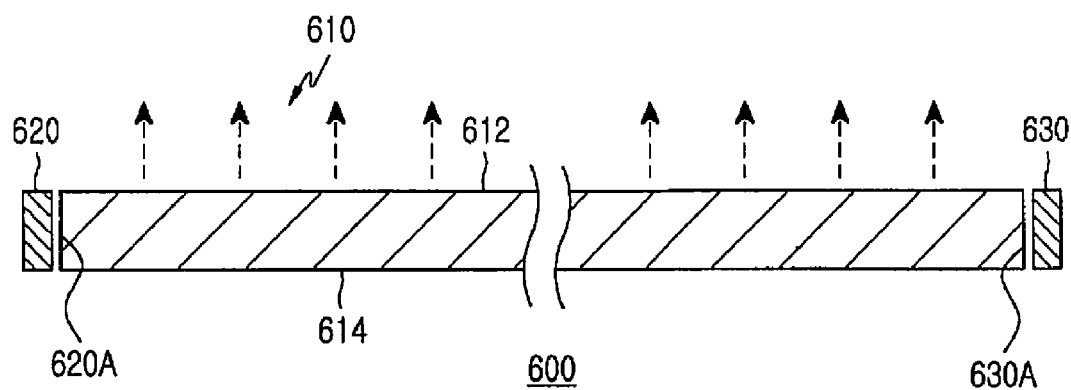
FIG. 11 illustrates an illumination apparatus with a longitudinally spread light guide according to a sixth embodiment of the present invention.
Figure 12:
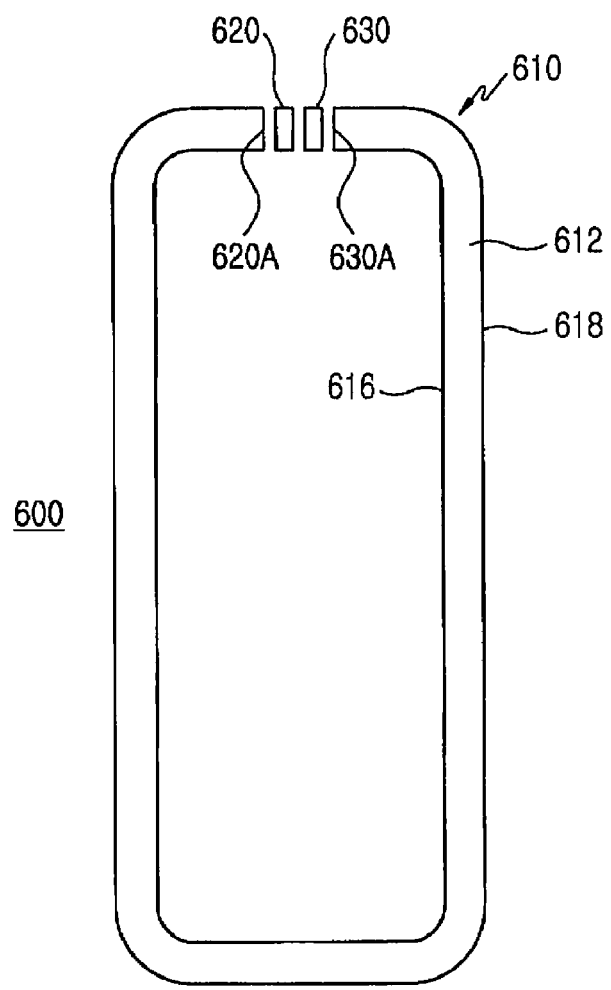
FIG. 12 illustrates the illumination apparatus with the light guide of FIG. 11, in a substantially rectangular shaped form.

FIG. 11 illustrates an illumination apparatus 600 with a longitudinally spread light guide 610, according to a sixth embodiment of the present invention, and FIG. 12 illustrates the illumination apparatus 600 with the substantially rectangular shaped light guide 610.

The illumination apparatus 600 includes a light guide 610, and first and second light sources 620 and 630.

The light guide 610 is substantially C-shaped and includes opposed upper surface 612 and lower surface 614, and inner and outer sides 616 and 618 between the upper surface 612 and the lower surface 614. The light guide 610 is implemented by bending a rectangular strip into a C-shape. The majority of the light input into the light guide 610 propagates through multiple reflections between the upper surface 612 and the lower surface 614, or between the inner and outer sides 616 and 618. The multiple reflections include common total internal reflection. Light extraction patterns are formed on the upper surface 612 of the light guide 610, and the light incident on the light extraction patterns is output to the exterior of the light guide 610 through scattering, refraction or penetration, for example.

The lower surface 614 and the inner and outer sides 616 and 618 of the light guide 610 are subjected to mirror-surface processing. As the light propagates from the light sources 620 and 630, the amount of propagating light gradually decreases due to the light output to the exterior. To offset the non-uniformity of light output over the propagation distance, the light guide 610 is made such that roughness-of-surface of the upper surface 612 gradually increases as its distance increases from the light sources 620 and 630.

The first light source 620 is disposed such that its light emitting surface faces a first end 620A of the light guide 610, and the second light source 630 is disposed such that its light emitting surface faces a second end 630A of the light guide 610. The light output from the first light source 620 is input into the light guide 610 through the first end 620A, and the input light propagates from the first end 620A to the second end 630A of the light guide 610. Similarly, the light output from the second light source 630 is input into the light guide 610 through the second end 630A, and the input light propagates from the second end 630A to the first end 620A of the light guide 610.

Figure 13:
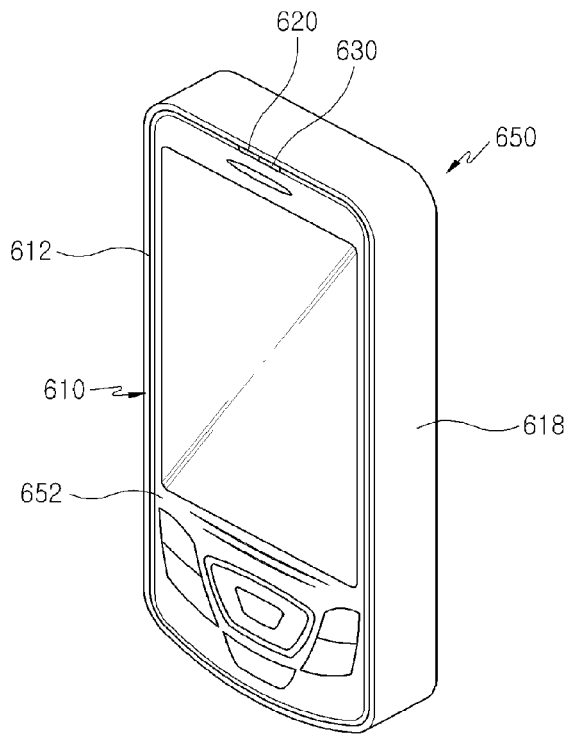
FIG. 13 illustrates a portable terminal with the illumination apparatus shown in FIG. 12.

FIG. 13 illustrates a portable terminal 650 with the illumination apparatus 600 shown in FIG. 12. On the front face of portable terminal 650 is disposed an LCD, a keypad and a speaker, and the illumination apparatus 600 is installed in the portable terminal 650. The upper surface 612 of the light guide 610 is exposed on or faces the front face 652 of the portable terminal 650.

Another illumination apparatus shown in FIG. 12 could also be installed in the portable terminal 650 in the form illustrated in FIG. 3.

Figure 14:
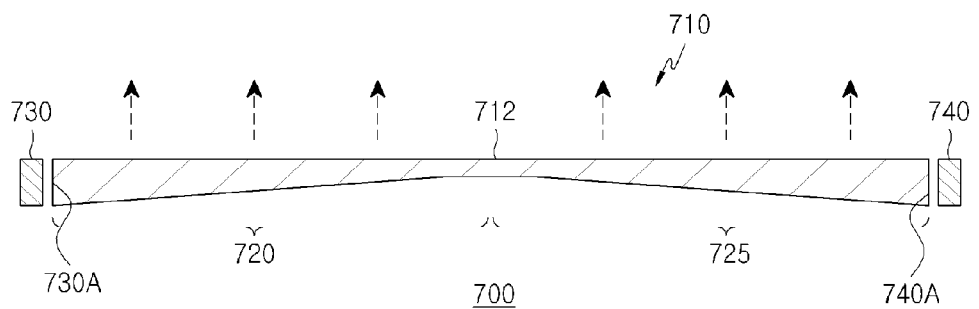
FIG. 14 illustrates an illumination apparatus with a longitudinally spread light guide, according to a seventh embodiment of the present invention.

FIG. 14 illustrates an illumination apparatus 700 with a longitudinally spread light guide 710, according to a seventh embodiment of the present invention.

The illumination apparatus 700 includes a light guide 710, and first and second light sources 730 and 740.

The light guide 710 includes opposed upper surface 712 and lower surface 714, and inner and outer sides (not shown) between the upper surface 712 and the lower surface 714. Although not illustrated, the light guide 710 is bent in a C-shape as shown in FIG. 12. The majority of the light input into the light guide 710 propagates through multiple reflections between the upper surface 712 and the lower surface 714, or between the inner and outer sides, and the multiple reflections include common total internal reflection. Light extraction patterns are formed on the upper surface 712 of the light guide 710, and the light incident on the light extraction patterns is output to the exterior of the light guide 710 through scattering, refraction or penetration, for example.

The light guide 710 includes first and second tapered portions 720 and 725 that gradually increase or decrease in width along its longitudinal direction. The first tapered portion 720 and the second tapered portion 725 gradually decrease in width towards the middle of the light guide 710, from opposing directions. The tapered portions 720 and 725 become thinner in such a manner that the lower surface 714 approaches the upper surface 712.

The first light source 730 is disposed such that its light emitting surface faces a first end 730A of the light guide 710, and the second light source 740 is disposed such that its light emitting surface faces a second end 740A of the light guide 710. The light output from the first light source 730 is input into the light guide 710 through the first end 730A, and the input light propagates from the first end 730A to the second end 740A of the light guide 710. Similarly, the light output from the second light source 740 is input into the light guide 710 through the second end 740A, and the input light propagates from the second end 740A to the first end 730A of the light guide 710.

The light propagating through the tapered portions 720 and 725 incurs a change in the angle of reflection as the widths of the tapered portions 720 and 725 gradually decrease. Thus, if a loss of light over the propagation distance is negligible, an increasing amount of light is output to the exterior of the tapered portions 720 and 725 as the width of the light guide 710 gradually decreases. That is, as the light propagates from the light sources 730 and 740, the amount of propagating light gradually decreases due to the light output to the exterior. Accordingly, the tapered portions 720 and 725 are used to offset the non-uniformity of light output over the propagation distance. Therefore, use of the tapered portions 720 and 725 improves the overall illumination uniformity of the light guide 710.

Figure 15:
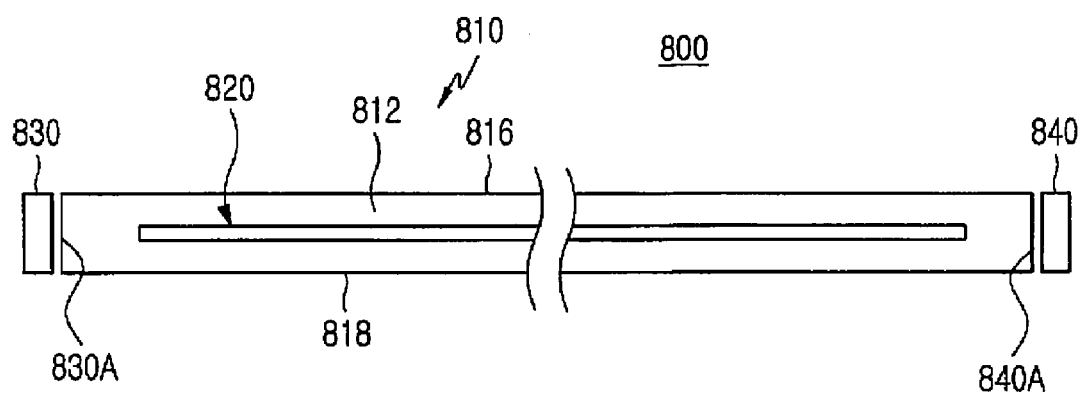
FIG. 15 illustrates an illumination apparatus with a longitudinally spread light guide, according to an eighth embodiment of the present invention.
Figure 16:
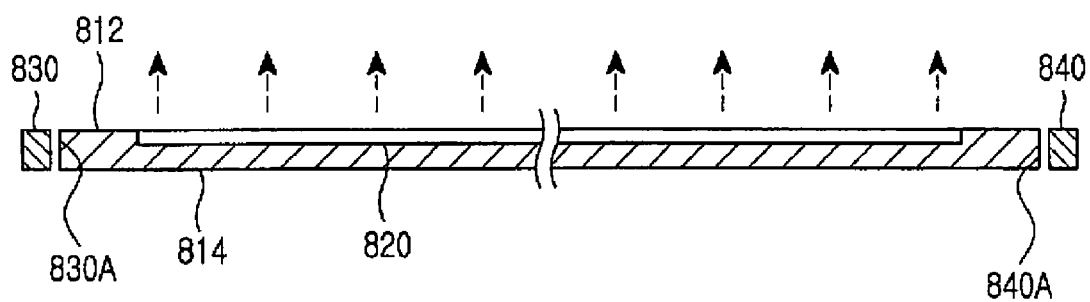
FIG. 16 illustrates light propagation of the illumination apparatus shown in FIG. 15.

FIG. 15 illustrates an illumination apparatus 800 with a longitudinally spread light guide 810, according to an eighth embodiment of the present invention, and FIG. 16 illustrates light propagation of the illumination apparatus 800.

The illumination apparatus 800 includes a light guide 810, and first and second light sources 830 and 840.

The light guide 810 includes opposed upper and lower surfaces 812 and 814, and inner and outer sides 816 and 818 between the upper surface 812 and the lower surface 814. Although not illustrated, the light guide 810 is bent in a C-shape as shown in FIG. 12. The majority of the light input into the light guide 810 propagates through multiple reflections between the upper surface 812 and the lower surface 814, or between the inner and outer sides 816 and 818, and the multiple reflections include common total internal reflection. A light extraction pattern 820 is formed on the upper surface 812 of the light guide 810, and the light incident on the light extraction pattern 820 is output to the exterior of the light guide 810 through scattering, refraction or penetration, for example. The light extraction pattern 820 is implemented with a groove that is formed in the upper surface 812 of the light guide 810.

The light extraction pattern 820 is implemented with grooves having sections in a variety of shapes.

Figure 17A:
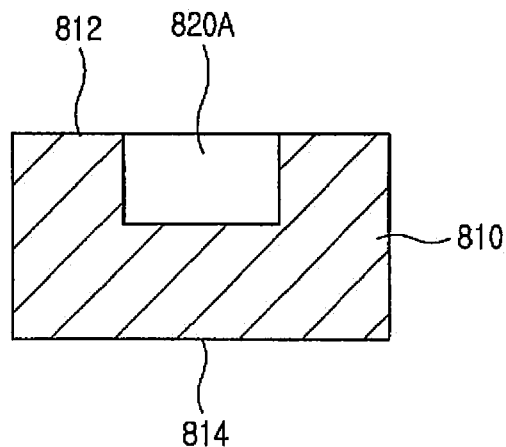
FIGS. 17A and 17B illustrate groove portions of an illumination apparatus with sections having a variety of shapes.
Figure 17B:
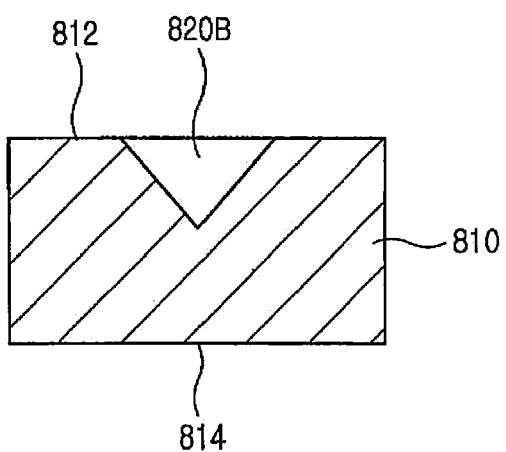

FIG. 17A illustrates a groove 820A with a rectangular section, and FIG. 17B illustrates a groove 820B with a triangular section.

Referring back to FIG. 16, the first light source 830 is disposed such that its light emitting surface faces a first end 830A of the light guide 810, and the second light source 840 is disposed such that its light emitting surface faces a second end 840A of the light guide 810. The light output from the first light source 830 is input into the light guide 810 through the first end 830A, and the input light propagates from the first end 830A to the second end 840A of the light guide 810. Similarly, the light output from the second light source 840 is input into the light guide 810 through the second end 840A, and the input light propagates from the second end 840A to the first end 830A of the light guide 810.

Figure 18:
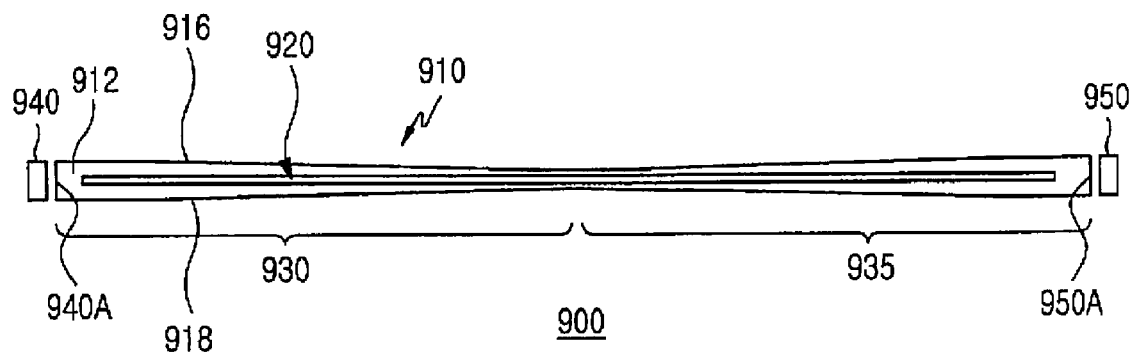
FIG. 18 illustrates an illumination apparatus with a longitudinally spread light guide according to a ninth embodiment of the present invention.
Figure 19A:
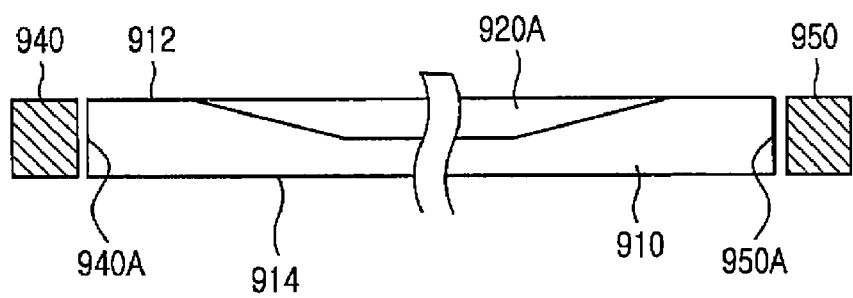
FIGS. 19A and 19B illustrate groove portions of a longitudinally spread light guide.
Figure 19B:
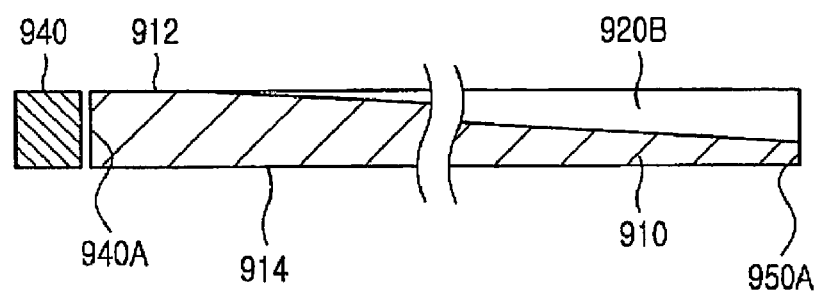

FIG. 18 illustrates an illumination apparatus 900 with a longitudinally spread light guide 910, according to a ninth embodiment of the present invention, and FIGS. 19A and 19B illustrate groove portions of the longitudinally spread light guide 910.

The illumination apparatus 900 includes a light guide 910, and first and second light sources 940 and 950.

The light guide 910 includes opposed upper surface 912 and lower surface 914, and inner and outer sides 916 and 918 between the upper surface 912 and the lower surface 914. Although not illustrated, the light guide 910 bent in a C-shape as shown in FIG. 12. The majority of the light input into the light guide 910 propagates through multiple reflections between the upper surface 912 and the lower surface 914, or between the inner and outer sides 916 and 918, and the multiple reflections include common total internal reflection. A light extraction pattern 920 is formed on the upper surface 912 of the light guide 910, and the light incident on the light extraction pattern 920 is output to the exterior of the light guide 910 through scattering, refraction or penetration, for example. The light extraction pattern 920 is implemented with a groove that is formed in the upper surface 912 of the light guide 910.

The light extraction pattern 920 is implemented with grooves having sections in a variety of shapes.

FIG. 19A illustrates a groove 920A with a dish-shaped section having a maximum depth at the center of the section. FIG. 19B illustrates a groove 920B with a tapered section having a depth that gradually increases from a first end 940A to a second end 950A of the light guide 910. As illustrated in FIG. 19B, it is preferable to exclude the second light source 950 when the light extraction pattern 920 is implemented with the groove 920B with the tapered section.

The change in depth of the grooves 920A and 920B is similar in effect to the change in thickness of the light guide 710 illustrated in FIG. 14. That is, an increase in depth of the grooves 920A and 920B results in a similar decrease in thickness of the light guide 710 illustrated in FIG. 14. Tilts of the grooves 920A and 920B are controlled by adjusting a shape, height and number of rotations of a bit mounted in an NC machine tool, as well as a tilt angle of the light guide 910, or by adjusting power, propagation speed and beam shape of a laser.

Referring back to FIG. 18, the light guide 910 includes first and second tapered portions 930 and 935. Each of the first and second tapered portions 930 and 935 gradually increases or decreases in width along its longitudinal direction. The first tapered portion 930 gradually decreases in width along the direction from the first end 940A to the center of the light guide 910, while the second tapered portion 935 gradually decreases in width along the direction from the second end 950A to the center of the light guide 910. The tapered portions 930 and 935 decrease in width in such a manner that the inner and outer sides 916 and 918 approach the light extraction pattern 920.

The first light source 940 is disposed such that its light emitting surface faces the first end 940A of the light guide 910, and the second light source 950 is disposed such that its light emitting surface faces the second end 950A of the light guide 910. The light output from the first light source 940 is input into the light guide 910 through the first end 940A, and the input light propagates from the first end 940A to the second end 950A of the light guide 910. Likewise, the light output from the second light source 950 is input into the light guide 910 through the second end 950A, and the input light propagates from the second end 950A to the first end 940A of the light guide 910.

As is apparent from the foregoing description, an illumination apparatus of the present invention provides a structure for outputting light through outer sides of a light guide. The illumination apparatus is efficiently applied for side illumination of portable terminals.

In accordance with the present invention, an illumination apparatus uses a light guide with a strip shape. The illumination apparatus is efficiently applied for front and side illumination of portable terminals.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. An illumination apparatus comprising:
   at least one light source for outputting light;
   a light guide for guiding the light input from the at least one light source through multiple reflections in the light guide;
   at least one groove formed on the light guide to reflect incident light; and
   a light extraction pattern formed on a surface of the light guide to output the incident light to an exterior of the light guide,
   wherein the light guide includes opposed upper and lower surfaces and an outer side between the opposed upper and lower surfaces, the at least one groove is formed on the upper surface, and the light extraction pattern is formed on the outer side of the light guide.

2. The illumination apparatus of claim 1, further comprising a hole formed in the light guide to accommodate the at least one light source.

3. The illumination apparatus of claim 1, wherein the at least one groove includes first and second grooves that are located at both sides of the at least one light source.

4. The illumination apparatus of claim 3, wherein the at least one light source includes first and second light sources;
wherein the first and second grooves are located at a side of the first and second light sources, respectively.

5. An illumination apparatus comprising:
at least one light source for outputting light;
a light guide shaped in a manner of a partially opened loop, and guiding light input from the at least one light source through multiple reflections in the light guide; and
a light extraction pattern formed on a surface of the light guide to output incident light to an exterior of the light guide,
wherein the light guide includes a tapered portion having a thickness that gradually decreases from one of opposed first and second ends of the light guide.

6. The illumination apparatus of claim 5, wherein the at least one light source includes first and second light sources that face the first and second ends of the light guide, respectively.

7. An illumination apparatus comprising:
at least one light source for outputting light;
a light guide shaped in a manner of a closed loop and guiding light input from the at least one light source through multiple reflections in the light guide; and
a light extraction pattern formed on a surface of the light guide to output incident light to an exterior of the light guide, wherein the light guide includes a coupling portion that protrudes from an inner side of the light guide, and the at least one light source faces one side of the coupling portion.

8. The illumination apparatus of claim 5, wherein the light guide includes opposed upper and lower surfaces, and an inner side and an outer side between the upper and lower surfaces, and the light extraction pattern is defined by a groove formed on the upper surface of the light guide.

9. The illumination apparatus of claim 8, wherein the groove changes in depth along a longitudinal direction of the light guide.

10. A portable terminal comprising the illumination apparatus as set forth in claim 1.

11. A portable terminal comprising the illumination apparatus as set forth in claim 5.

* * * * *